Sept. 20, 1966     E. NAGEL ETAL     3,273,408
DRIVE APPARATUS FOR A CARRIAGE MOVABLE UPON A GUIDE
Filed Dec. 3, 1964     3 Sheets-Sheet 1
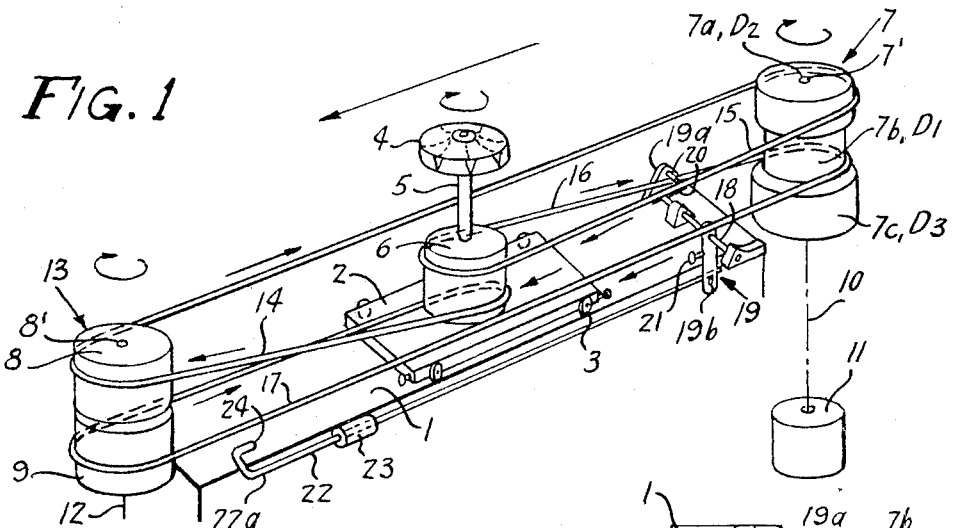
FIG. 1
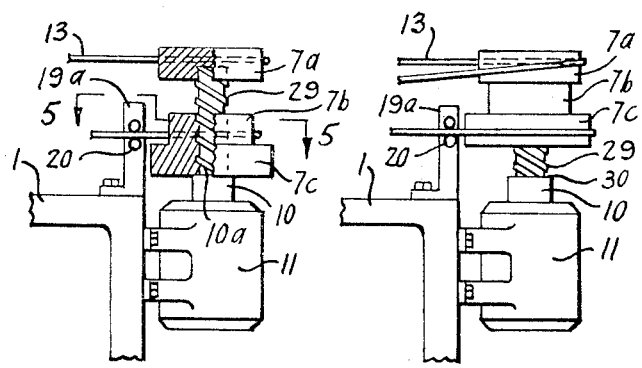
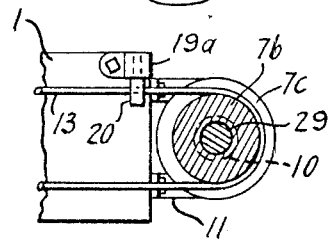
FIG. 3    FIG. 4    FIG. 5
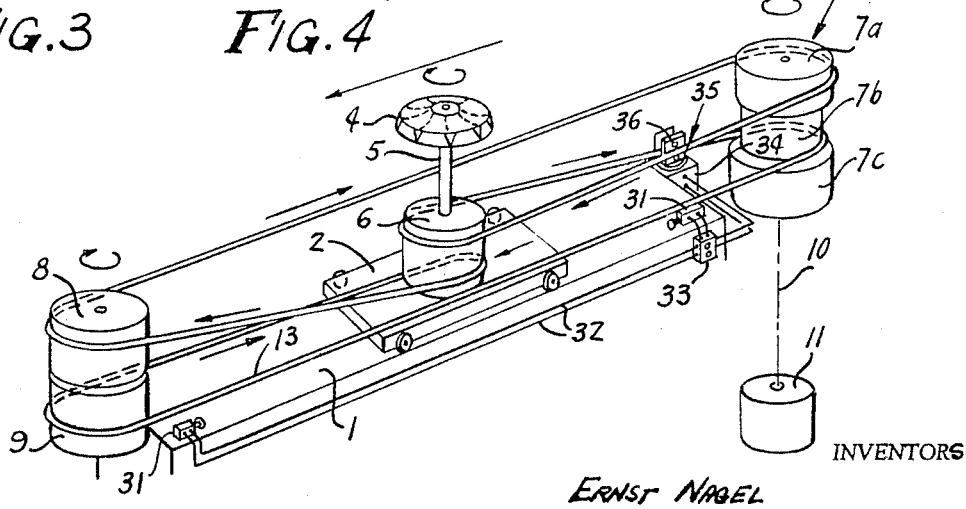
FIG. 2
INVENTORS
ERNST NAGEL
WERNER STEINMETZ
BY Werner W Kleeman
ATTORNEYS.

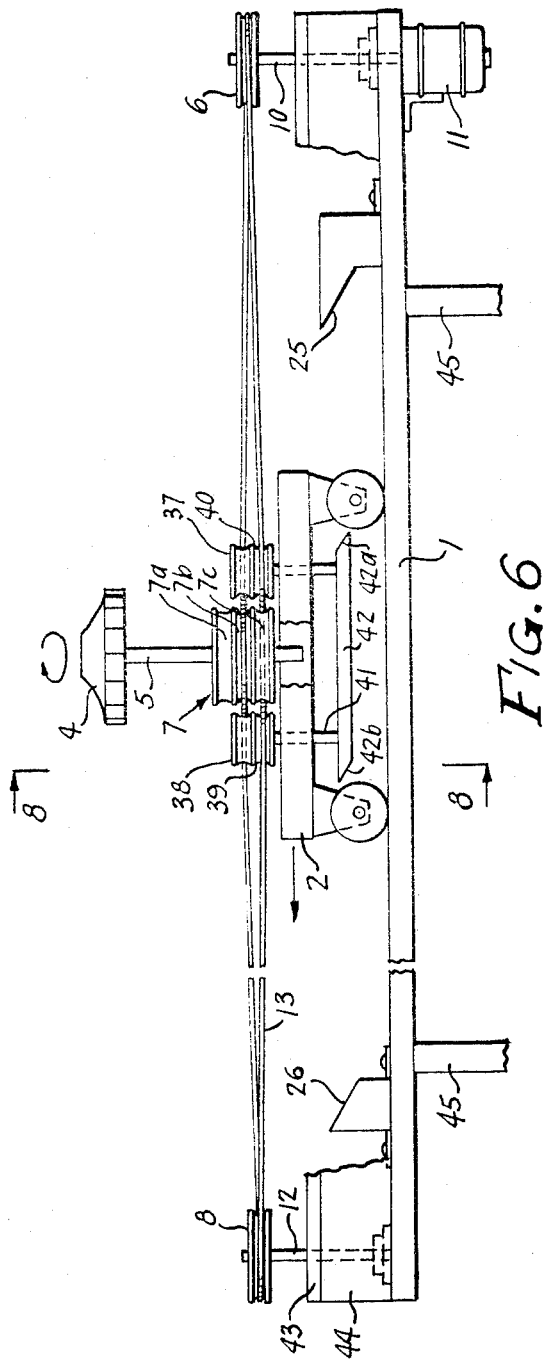
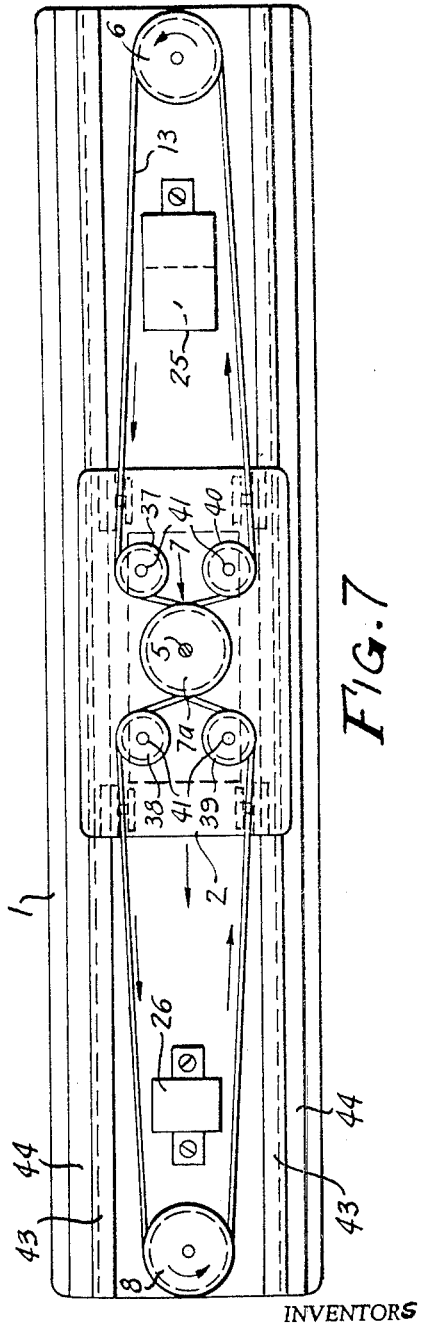
INVENTORS
ERNST NAGEL
WERNER STEINMETZ
BY Werner W Kleeman
ATTORNEYS.

United States Patent Office 3,273,408
Patented Sept. 20, 1966

3,273,408
DRIVE APPARATUS FOR A CARRIAGE MOVABLE UPON A GUIDE
Ernst Nagel, Weisslingen, and Werner Steinmetz, Kempten, Zurich, Switzerland, assignors to Pneumafil Corporation, Charlotte, N.C.
Filed Dec. 3, 1964, Ser. No. 415,591
Claims priority, application Switzerland, Dec. 6, 1963, 14,981/63
13 Claims. (Cl. 74—22)

The present invention relates to an improved drive apparatus for a carriage or wagon which is movable back and forth upon a guide.

A wide variety of devices have become known which are housed upon a carriage which is movable upon guides and which can be displaced together with such carriage back and forth between the ends of the guides, the latter constructed as rails for example. Thus, for example with textile machines, such as for instance winding machines, spinning and twisting machines, so-called travelling blowers have already come into use for longer times which carry a ventilator mounted to a carriage which blows away dust and fibers from the machine components or parts. Moreover, drive mechanisms have already become known which, for example, incorporate an endless cable which trains around turning or deflecting rollers applied to the ends of a guide. One of the rollers is driven and the carriage is coupled in suitable manner with the cable in order to generate the to and fro movement. In so doing, in most cases the cable is employed as a pulling member.

However, also for the displacement of loads, in particular for the raising and lowering of the same, drive mechanisms for carriages displaceable upon guides have become known which work with gear chains. In a known drive apparatus of this type, the gear chain is closed and not only wraps around the sprocket wheels at the ends of the guides, rather by means of suitable deflecting wheels also trains around two sprocket wheels of different diameter rotatably mounted at the carriage, these sprocket wheels being rigidly connected for rotation with one another. In so doing, a respective run of the chain engages with one of the wheels, so that when the chain is placed into revolving motion the carriage is displaced due to rolling of both different size sprocket wheels at the chain runs moving with the same speed. By changing the direction of rotation of the chain it is possible to change the direction of movement of the carriage.

Accordingly, the present invention, starting from an apparatus of the last-mentioned type, is directed to the provision of an improved drive apparatus in which, in addition to the movement of the carriage, at the same time there is available another movement which can be effectively utilized.

A further important object of the present invention is directed to the provision of an improved drive apparatus for the movement of a carriage back and forth in a highly reliable and effective manner, the construction of this drive apparatus being relatively simple and economical.

Generally speaking, the inventive drive apparatus is characterized by the features that a pulley wheel of the carriage is in driving relation with a working or operable member rotatably mounted at the carriage in order to utilize the rotation resulting from the rolling movement, and that reversing or switching means are provided in order to reverse the direction of movement of the carriage with the direction of rotation of the pulley wheel and the operable member remaining the same. The switching means cooperate with one of the step pulleys and the endless member in order to cause such endless member to change the wrapped around pulley step.

An apparatus of the mentioned type has the advantage that the carriage as well as the operable member mounted to such carriage are driven by means of a single stationarily mounted motor. Consequently, there are avoided the troublesome electrical connections necessary for the electric motor of an operable member and heretofore mounted to the carriage. In addition thereto, there is, of course, also rendered simpler installation upon the carriage due to avoiding the use of an additional drive motor. Thus, there can also be used guides which are of lighter construction.

However, a considerable advantage resides in the fact that, the inventive drive apparatus guarantees the preservation of a single direction or rotation of the operable member in spite of changes in the direction of movement of the carriage at its points of turning or reversing. Consequently, it is possible to employ operable members where the direction of rotation must be maintained constant, and, in this manner, to operate or, however, to increase the efficiency of the operable member, for example a ventilator, by designing such for a single direction of rotation.

Other features, objects and advantages of the invention will become apparent by reference to the following detailed description and drawings in which:

FIGURE 1 is a perspective view of a first embodiment of the invention with belt strands of differently effective rotational speeds and with a purely mechanical reversing or switching mechanism for changing the direction of movement of the travelling blower;

FIGURE 2 illustrates a modification of the embodiment of FIGURE 1, in this case an electro-magnetic switching or reversing mechanism is employed for changing the travelling direction of movement of the travelling blower;

FIGURE 3 illustrates the details of an automatic mechanism for reversing the direction of movement of a travelling blower, which is effective upon abutment of the travelling blower at an obstacle during the movement towards the left, such view being partly in section and shown in elevation;

FIGURE 4 illustrates details of the automatic reversal mechanism during the movement of the travelling blower to the right;

FIGURE 5 is a cross-sectional view of the apparatus of FIGURE 3, taken along the line V—V thereof;

FIGURE 6 illustrates a further embodiment of drive mechanism with belt strands of the same peripheral speed and shown in elevation;

FIGURE 7 is a plan view of the embodiment depicted in FIGURE 6; and

Figure 8:
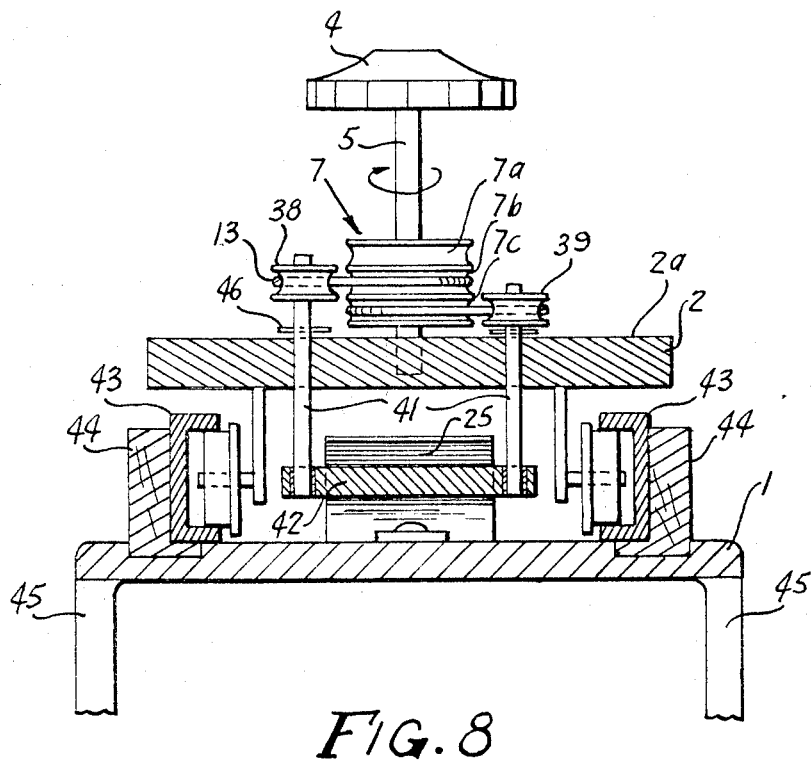
FIGURE 8 is a cross-sectional view of the embodiment of FIGURE 6, taken along the line VIII—VIII thereof.

Describing now the drawings, more particularly, with attention directed to the embodiment of FIGURE 1, it will be seen that reference numeral 1 designates a guideway or track upon which is displaceable a carriage or wagon 2 provided with rollers or runners 3. A ventilator is provided at the carriage 2 which is schematically illustrated by means of its impeller 4. The shaft 5 which is to be driven and carrying the impeller 4, is in driving connection with a belt pulley 6 which is rotatably mounted at the carriage 2 together with the shaft 5 and the ventilator 4.

Belt pulleys 7 and 8, 9 are arranged at both ends of the guideway 1 and possess shafts 7′ and 8′, respectively, which extend substantially parallel to the shaft 5 of the belt pulley 6, with all such shafts of these belt pulleys advantageously disposed in a common plane. The belt pulley 7, by way of example, is directly mounted upon a shaft 10 of an electric drive motor 11 which is connected to a non-illustrated machine frame supporting the guideway 1. Moreover, the belt pulley 7, in this embodiment, comprises three pulley components or members 7a, 7b and 7c which are rigidly connected for rotation with one another. It will also be understood that the belt pulley member 7a possesses the diameter $D_2$, the belt pulley mmeber 7b the diameter $D_1 = D_2 - K$, and the belt pulley member 7c the diameter $D_3 = D_2 + K$, whereby K in both cases has the same value. As a result, $D_2 = D_1 + D_3/2$.

The turning or deflecting belt pulleys 8 and 9 arranged at the opposite end of the guideway 1 have the same diameter. They are loosely rotatably mounted independently of one another upon a common shaft 12. The shaft 12, in turn, is rigidly connected to the machine frame. An endless drive or power transmission belt, generally designated by reference numeral 13, travels over the belt pulley means 6, 7, 8 and 9. This drive belt 13 is advantageously divided into a number of driving and driven strands or runs. Assuming that the drive shaft 10 rotates in clockwise direction during operation of the electric drive motor 11, it should be appreciated that a driving strand or run 14 extends from the belt pulley means 6 over the deflecting or turning pulley 8 to the pulley member 7a of the belt step pulley 7. A driven strand or run 15 extends from the belt pulley member 7a to the belt pulley 6, and from this location there subsequently extends a driving strand or run 16 to the belt pulley members 7b. From this belt pulley member 7b there extends a driven strand or run 17 which trains about the deflecting belt pulley 9 and finally again connects with the driving strand or run 14 at the belt pulley 6.

Belt guide means incorporating a double-arm lever arrangement 19 is pivotably mounted upon a shaft or pin 18 in the neighborhood of the right end of the guideway 1 of FIGURE 1. This double-arm lever arrangement 19 carries at one of its arms 19a two rollers 20 which straddle the driving belt 13. Moreover, the double-arm lever arrangement 19 carries at a further arm 19b an impact or stop member 21 destined to cooperate with the carriage 2, this arm 19b being also articulated with a rod 22 displaceable in a sleeve or bushing 23 substantially parallel to the guideway 1. At the end 22a of the rod 22 which is remote from the double-arm lever arrangement 19 and neighboring the left end of the guideway 1, there is provided an impact or stop member 24. This stop member 24 is likewise situated in the path of travel of the carriage 2 and when the latter reaches the corresponding terminal position such stop member cooperates therewith.

During operation of the described drive apparatus the belt 13 is caused to rotate by means of the belt step pulley 7, whereby the driving belt strands or runs 14 and 16 exhibit a different rotational speed corresponding to the difference $K = D_2 - D_1$. The rotational speed of the belt strand 14, which only experiences a turning effect via the belt pulley 8, is thus larger than that of the belt strand 16. Analogously, the rotational speed of the driven belt strand 15 is larger than that of the likewise driven belt strand 17 turned via the belt pulley 9. Consequently, the belt pulley 6 rolls upon the driving belt strand 16 and the driven belt strand 17 since these possess a lower rotational speed than the belt strands 14 and 15. As a result, there is brought about a rotation in clockwise direction of the shaft 5 which is to be driven as well as a displacement of the carriage 2 in a direction toward the left end of the guideway 1.

Now, when the carriage 2 abuts against the stop member 24 the rod 22 is displaced to the left, so that the double-arm lever arrangement 19 is rocked in clockwise direction. In so doing, the straddling guide rollers 20 press the elastic belt 13, for example formed of nylon, downward and displace such from the belt pulley portion or member 7b onto the belt pulley portion or member 7c of the step pulley unit 7. Consequently, the rotational speed of the belt strands 16 and 17 will now be greater than that of the belt strands 14 and 15, since the diameter of the belt pulley portion 7c is greater than the diameter of the pulley portion 7a by the value of K. Now, the carriage 2 is driven with the same speed in the opposite direction, in spite of the fact that—with negligible increase of the rotational speed—the direction of travel of the belt 13 and the direction of rotation of the belt pulley 6 remains the same. Such results in the belt pulley 6 rolling upon the belt strands 14 and 15. If the carriage 2 abuts against the stop member 21 then the belt 13 is again displaced onto the belt pulley portion 7b due to pivoting of the double-arm lever 19 in counterclockwise direction. This again effects a change in the direction of travel of the carriage 2, not however any change in the direction of rotation of the shaft 5 driving the ventilator impeller 4. By virtue of the foregoing, thus, it is possible to advantageously design the impeller 4 for operation in a single direction of rotation and, therefore, it possesses more favorable operating characteristics.

It is to be observed that the belt pulleys and reversing means are also only schematically depicted in the hereinafter described embodiments and do not, of necessity, correspond to a practical embodiment. Additionally, reversal or switch-over can also take place electromagnetically, or hydraulically, instead of mechanically, by employing appropriate end or terminal switches, and the rod 22 is also capable of replacement by a cable or chain. Furthermore, the pulley means 7 disclosed herein can also be designed as an infinitely variable or stepless pulley. Hence the term "step pulley" as employed herein is used in a broader sense to include any multiple diameter pulley construction, and therefore, also embraces the aforementioned possibility of an infinitely variable pulley, a pulley construction whose diameter can be varied, and the depicted "stepped" pulley of the embodiment of FIGURE 1 for instance, having different pulley portions of different diameters. Accordingly, this term "step pulley" is not to be considered as limited only to the herein previously depicted stepped pulley construction.

Additionally, it should be appreciated that it is possible to achieve a constant belt length and shaft rotational speed by constructing the belt pulley 7 with the diameter $D_2 = D_3 = D_1 + K$. Such, however, requires an additional switching or displacement of the belt strand 15 upon the pulley portion 7b, thereby further requiring an appropriate construction of the switching or reversing mechanism 18–20.

It will also be understood that the speed of travel of the carriage 2 is only dependent upon the difference in the speeds of the belt strands, whereas the rotational speed of the impeller 4 is dependent upon the diameter ($D_6$) of the belt pulley 6. Both values can be freely selected within certain practical limits and can be accommodated to the conditions which are encountered.

A typical example, given by way of illustration and not limitation, possesses the following data:

$D_2 = 121$ millimeters—Rotational speed of impeller:
 $n = 3400$ r.p.m.
$D_6 = 106$ millimeters—Speed of carriage:
 $u = 18$ meters/min.
$K = 4$ millimeters—Length of guideway: 18 meters.

In FIGURE 2, wherein the same reference numerals are again generally employed for substantially the same or analogous elements, there is dipicted a further possibility for controlling switching-over of the driving belt 13 by means of the carriage 2. It will be seen that at the ends of the guideway 1 there is mounted a respective terminal or end switch 31 which, in known manner, are suitably operably coupled together by current leads or conductors 32 in a switching box 33 and which are further connected with a magnetic switch 34 mounted in the region of the belt pulley 13 adjacent the belt pulley unit 7. The movable switching plunger or rod 35 of this magnetic switch 34 carries the roller members 36 straddling the belt 13.

With this arrangement, if the carriage 2 runs against one of the terminal switches 31 then such triggers an electric control pulse which displaces the switching plunger 35 of the magnetic switch 34. During this movement the driving belt 13 straddled between the rollers 36 is displaced from the belt pulley portion 7b onto the belt pulley portion 7c, this causing the carriage 2 to move in the opposite direction.

Now, if the carriage 2 has reached the other end of the guideway 1 then the associated terminal switch 31 delivers an impulse which moves the switching plunger 35 in the other direction, so that the driving belt 13 is displaced from the belt pulley portion 7c onto the belt pulley portion 7b, this again effecting a reversal of the direction of movement of the carriage 2.

It can be advantageous to bring about reversal of the movement of the travelling blower, if it encounters an obstacle, before it has reached the end of its path of travel. As shown in FIGURES 3 to 5, this can be achieved, by way of example, in that the three stage or step pulley 7 is constructed such that the member or portion 7a is rigidly connected with the drive shaft 10 of the electric drive motor 11. Such shaft 10 then advantageously possesses a curved rail or threaded portion 29 in the region of the belt pulley members or portions 7b, 7c. The belt pulley portions 7b, 7c rigidly connected with one another and provided, for instance, with an internal left-hand threading 10a, can move upon the threaded portion 29 of the drive shaft 10. Limitation of this movement takes place, on the one hand, by means of the belt pulley member or portion 7a, and, on the other hand, by virtue of a suitable stop member 30 arranged at the shaft 10. In this embodiment, the rollers 20 straddling the driving belt 13 are not displaceably mounted at the height of the belt pulley portion 7c of FIGURE 1.

In this case, if the travelling blower strikes against an obstacle then the carriage 2 is stopped. Since the drive motor 11 continues to run there appears slip at the driving belt 13 which brings about the phenomenon that the different peripheral speeds at the different size belt pulley portions 7b and 7c rotating with the same angular velocity attempt to balance one another. The smaller belt pulley portion trained by the driving belt 13 is therefore accelerated, the larger pulley portion delayed, so that the double-belt pulley disk unit 7b, 7c moves relative to the belt pulley portion 7a due to the left-hand threading 10a, whereby at the same time the stationary roller 20 displaces the belt 13 onto the pulley disk portion 7c, so that the travelling blower is now displaced in the other direction.

Upon contacting an obstacle in the other direction from that assumed during the description of FIGURE 3, and as will be best understood by referring to FIGURE 4, the belt pulley portion 7a is accelerated, so that the pulley portion 7a and the coupled pulley portions 7b, 7c tend to move apart, whereby, at the same time, the belt 13 is displaced onto the pulley disk portion 7b, thus moving the travelling blower in the other direction. This manner of reversing the direction of travel of the carriage 2 can, of course, also be employed at the ends of the path of travel of the carriage, in that cushions or buffers are provided at such location which make it impossible for the carriage to move further.

Naturally, there are still other possibilities for achieving reversal of the carriage upon striking an obstacle, for example by means of a cable fixed to the carriage which is guided about a deflecting roller at the ends of the path of travel and during motion of the carriage drives a small current generator or a centrifugal pendulum. When the travelling blower is stationary the voltage of the generator collapses and actuates a stepping mechanism which acts upon an electromagnet which causes a shifting linkage or rod to change the position of the belt. In similar manner it is possible to use the linkage or rod of a centrifugal pendulum which moves when the carriage stops in order to actuate a reversing switch which, in turn, again acts via an electromagnet, or directly, upon the shifting linkage for displacing the driving belt.

Basically, it is also possible to reverse the arrangement described in conjunction with FIGURES 1 and 2, of stationary, multiple-step belt pulley means and single-step belt pulley means movable with the carriage. Such an arrangement will now be considered.

Hence, by directing attention now to the embodiment depicted in FIGURES 6, 7 and 8 it will be observed that the guideway, in this case, comprises two guide rails 43 possessing the cross-sectional configuration of a lying "U." These rails 43 are connected via wooden beams 44 to the frame 45 of a spinning machine for instance. A respective wedge-shaped cam 25 and 26 is arranged at each end and between the rails 43. The carriage 2 movable upon the rails 43 carries the same equipment as in the first embodiment; however, the three-step pulley disk unit 7 which possesses three rigidly interconnected pulley disks or members 7a, 7b, 7c, wherein the pulley member 7a has the diameter $D_1$, the pulley member 7b the diameter $D_2=D_1-K$ and the pulley member 7c the diameter $D_3=D_1$, in this embodiment is arranged upon the carriage 2. Also in this embodiment, the belt pulley 6 is stationary and possesses a common drive shaft 10 with the drive motor 11 threadably connected beneath the frame 45. This drive shaft 10 is additionally mounted in the frame 45. The shaft 12 of the simply constructed deflecting roller or disk 8 is not rotatably connected to the frame 45 of the spinning machine. Additionally, four guide rollers 37, 38, 39 and 40 rotatable about their associated shaft 41 are mounted upon the carriage 2 symmetric to a transverse axis and a lengthwise axis and around the belt pulley disk unit 7. These four guide rollers 37, 38, 39 and 40 piercingly extend through the carriage 2 and are conjointly axially mounted at a control plate 42 located beneath the carriage 2 and are vertically movable together with such. Pins 46 piercingly extend through the shafts 41 directly above the floor 2a of the carriage 2 and determine the lowermost position of these shafts 41. The frontal ends 42a and 42b of the control plate 42 are destined to cooperate with the cams 25 and 26 and are appropriately beveled, as shown. An endless driving belt 13 successively trains about the belt pulley disk 6, the guide roller 37, the belt pulley disk 7b, the guide roller 38, the turning or deflecting roller 8, the guide roller 39, the belt pulley disk 7c and the guide roller 40.

During operation of this arrangement, the drive motor 11 rotates the belt pulley 6 in counterclockwise direction and such, in turn, displaces the driving belt 13. Since the belt pulley 6 has the same diameter at all locations there is imparted to the driving belt 13 a uniform rotational speed. The movement of the belt 13 is transmitted to the belt pulley unit 7 and the ventilator impeller 4. The belt 13 engages at the belt pulley unit 7 with the pulley disks 7b and 7c of different diameter ($D_1$ and $D_2$), thereby having the tendency to generate two different rotational speeds at the belt pulley unit 7 corresponding to the respective diameters. However, since both belt pulley disks 7b and 7c are rigidly connected with one another only a single rotational speed can result, this being rendered possible due to rolling of the belt pulley unit 7 upon the driving belt 13 in the direction of the speed of the belt strand contacting the pulley disk of smaller diameter. As a result, the carriage 2 moves towards the left side of the guide rails 43.

When the control plate 42 rides upon the cam 26 the former is moved upwards due to the beveling feature of end 42b and simultaneously displaces the shafts 41 of the guide rollers 37, 38, 39 and 40 collectively upwards, whereby the deep grooves of the aforesaid guide rollers cause the belt strands wrapped about the pulley disks 7b and 7c to train about the pulley disks 7a and 7b respectively. Consequently, the direction of the velocity of the belt has changed to the smaller pulley disk 7b and the carriage 2 thus moves with the same speed in the opposite direction while the ventilator impeller 4 rotates further with the same rotational speed and rotational sense, since the driving belt 13 has maintained its speed and direction. The reversal of the direction of movement of the carriage 2 via the cam 25 at the right end of the rails 43 takes place in analogous manner, such cam 25 downwardly displacing the control plate 42, thereby causing the strands of the belt 13 to train about the pulley disks 7b and 7c, whereby the carriage 2 is again moved to the left while retaining the direction of rotation of the ventilator impeller 4. The guide rollers 37, 38, 39 and 40 have the additional function of increasing the training angle of the belt pulley unit 7 in order to prevent slip of the driving belt 13.

While there is shown and described present preferred embodiments of the invention it is to be distinctly understood that the invention is not limited thereto but may be otherwise variously embodied and practised within the scope of the following claims.

What is claimed is:

1. Drive apparatus comprising, in combination, a guideway, a carriage movable back and forth upon said guideway, pulley means mounted at the ends of said guideway and at said carriage, one of said pulley means mounted at the end of said guideway being capable of being driven, an endless member extending about said pulley means of said guideway, said pulley means of said carriage being trained by two different strands of said endless member, at least one of said pulley means being constructed to provide a step pulley having pulley steps of different diameter in order to generate a rolling movement of said pulley means of said carriage at one of said strands, an operable member rotatably mounted at said carriage, said pulley means of said carriage being operatively coupled with said operable member in order to utilize the rotation of said pulley means of said carriage resulting during said rolling movement, reversing means for reversing the direction of movement of said carriage while the direction of rotation of said pulley means and said operable member remains the same, said reversing means cooperating with one of the pulley steps and said endless member in order to displace the latter from its trained pulley step.

2. Drive apparatus as defined in claim 1, said reversing means being positioned to be actuated by said carriage.

3. Drive apparatus as defined in claim 2, including stop means cooperating with said carriage at the locations where the direction of travel of said carriage is to be reversed, guide means for said endless member cooperating with said stop means.

4. Drive apparatus as defined in claim 3 wherein said endless member is a belt, said guide means straddling said belt.

5. Drive apparatus as defined in claim 1, said reversing means incorporating a displacing mechanism.

6. Drive apparatus as defined in claim 5, said displacing mechanism cooperating with said endless member.

7. Drive apparatus as defined in claim 5, said displacing mechanism cooperating with said one pulley means constructed to provide pulley steps.

8. Drive apparatus as defined in claim 5, wherein said one pulley capable of being driven defines said step pulley, a drive shaft including screw means for displaceably supporting said step pulley between two terminal positions with respect to said drive shaft.

9. Drive apparatus as defined in claim 1, including a stationary drive motor for driving said one pulley means capable of being driven, said last-mentioned one pulley means comprising belt pulley means of different diameter and providing said step pulley, said endless member being a belt member, said two different strands of said belt member engaging at the same diameter of said pulley means of said carriage, a shaft rotatably mounting said operable member and driven by said pulley means of said carriage.

10. Drive apparatus as defined in claim 9, said belt member incorporating two driving belt strands and two driven belt strands, the other of said pulley means mounted at an end of said guideway providing deflecting belt pulley means, a respective driving belt strand and driven belt strand trained about said deflecting belt pulley means.

11. Drive apparatus as defined in claim 9, wherein said belt pulley means comprises a stepped belt pulley.

12. Drive apparatus as defined in claim 1, wherein said operable member is a ventilator impeller.

13. Drive apparatus as defined in claim 1, including a stationary drive motor for driving said one pulley means capable of being driven, said last-mentioned one pulley means comprising belt pulley means of the same diameter, said endless member being a belt member, said pulley means of said carriage possessing belt pulley means of different diameter and providing said step pulley, said two different strands of said belt member engaging at respective different diameters of said pulley means of said carriage, a shaft rotatably mounting said operable member and driven by said pulley means of said carriage.

References Cited by the Examiner

UNITED STATES PATENTS

| | | | |
|---|---|---|---|
| 396,430 | 1/1889 | Reichel. | |
| 2,569,794 | 10/1951 | Arnold et al. | 74—37 |
| 2,884,788 | 5/1959 | Clark | 74—95 X |

FOREIGN PATENTS 166,615   8/1950   Austria.

FRED C. MATTERN, Jr., *Primary Examiner.*

BROUGHTON G. DURHAM, *Examiner.*

D. H. THIEL, *Assistant Examiner.*